US012783892B2

(12) United States Patent
Rudolph et al.

(10) Patent No.: US 12,783,892 B2
(45) Date of Patent: Nov. 3, 2026

(54) LATENT OUTLIER EXPOSURE FOR ANOMALY DETECTION

(71) Applicant: Robert Bosch GmbH, Stuttgart (DE)

(72) Inventors: Maja Rudolph, Madison, WI (US); Chen Qiu, Sindelfingen (DE)

(73) Assignee: Robert Bosch GmbH (DE)

( * ) Notice: Subject to any disclaimer, the term of this patent is extended or adjusted under 35 U.S.C. 154(b) by 1272 days.

(21) Appl. No.: 17/670,071

(22) Filed: Feb. 11, 2022

(65) Prior Publication Data

US 2023/0259785 A1 Aug. 17, 2023

(51) Int. Cl.
*G06N 3/088* (2023.01)
*G06N 3/0895* (2023.01)

(52) U.S. Cl.
CPC ........... *G06N 3/088* (2013.01); *G06N 3/0895* (2023.01)

(58) Field of Classification Search
CPC ...... G06N 3/088; G06N 3/0895; G06N 3/045; G06V 10/765; G06V 10/774; G06V 10/82; G06V 20/35
See application file for complete search history.

(56) References Cited

U.S. PATENT DOCUMENTS 8,321,220 B1 * 11/2012 Chotimongkol ....... G09B 19/04 704/277
2019/0120719 A1 * 4/2019 Koizumi ............ G05B 19/4065
2019/0130279 A1 * 5/2019 Beggel .................... G06N 3/088
2020/0233060 A1 * 7/2020 Lull ....................... G01S 7/4039
2021/0272704 A1 * 9/2021 Sudo ..................... G06N 3/0442
2022/0261593 A1 * 8/2022 Yu .......................... G06F 18/214
2022/0318557 A1 * 10/2022 Mohseni ................ G06V 10/82
2023/0089481 A1 * 3/2023 Liu ...................... G06N 3/0455 706/15

OTHER PUBLICATIONS

Bekuzarov, "Losses explained: Contrastive Loss" Apr. 19, 2020, <medium.com/@maksym.bekuzarov/losses-explained-contrastive-loss-f8f57fe32246> (Year: 2020).*

O. Kopuklu, J. Zheng, H. Xu and G. Rigoll, "Driver Anomaly Detection: A Dataset and Contrastive Learning Approach," 2021 IEEE Winter Conference on Applications of Computer Vision (WACV), Waikoloa, HI, USA, 2021, pp. 91-100, doi: 10.1109/WACV48630.2021.00014. (Year: 2021).*

(Continued)

*Primary Examiner* — James D. Rutten
(74) *Attorney, Agent, or Firm* — Dickinson Wright PLLC

(57) ABSTRACT

A device control system includes a controller. The controller may be configured to, receive a data set of N samples that includes normal and unlabeled unidentified anomalous data samples, process, via a model, the data set to produce an anomaly score associated with each sample in the data set, rank the normal and anomalous data samples according to the anomaly score associated with each data sample to produce a ranked order, label a fraction α of the N samples that have the highest scores with an anomaly label and the remaining samples with a normal label, retrain the model using all N samples, the labels, and a joint loss function, repeat the process, rank, label, and retrain steps until the ranked order and labels for all of the N samples do not change, and operate the device control system based on the trained model.

20 Claims, 12 Drawing Sheets

(e) G-Truth

(56) References Cited

OTHER PUBLICATIONS

Liu et al. "Anomaly Detection on Attributed Networks via Contrastive Self-Supervised Learning" Feb. 27, 2021, arxiv.org, <arxiv.org/abs/2103.00113> (Year: 2021).*

Zheng et al., "Generative and Contrastive Self-Supervised Learning for Graph Anomaly Detection" Jan. 23, 2022, arxiv.org, < arxiv.org/abs/2108.09896 > (Year: 2022).*

S. Bulusu, B. Kailkhura, B. Li, P. K. Varshney and D. Song, "Anomalous Example Detection in Deep Learning: A Survey," in IEEE Access, vol. 8, pp. 132330-132347, 2020 (Year: 2020).*

Jinsung Yoon, Kihyuk Sohn, Chun-Liang Li, Sercan O Arik, Chen-Yu Lee, and Tomas Pfister. Selftrained one-class classification for unsupervised anomaly detection. arXiv preprint arXiv:2106.06115, 2021, 17 pages.

Dan Hendrycks, Mantas Mazeika, Saurav Kadavath, and Dawn Song. Using self-supervised learning can improve model robustness and uncertainty. Advances in Neural Information Processing Systems, 32:15663-15674, 2019, 12 pages.

Anonymous. Anomaly detection for tabular data with internal contrastive learning. In Submitted to the Tenth International Conference on Learning Representations, 2022, 26 pages.

* cited by examiner

LATENT OUTLIER EXPOSURE FOR ANOMALY DETECTION

TECHNICAL FIELD

This disclosure relates generally to anomaly region detection in a machine learning system. More specifically, this application relates to improvements in anomaly region detection via a machine learning system trained using latent outlier exposure via a combination of normal and anomalous data.

BACKGROUND

In data analysis, anomaly detection (also referred to outlier detection) is the identification of specific data, events, or observations which raise suspicions by differing significantly from the majority of the data. Typically, the anomalous items will translate to some kind of problem such as a structural defect, faulty operation, malfunction, a medical problem, or an error.

SUMMARY

A method of training a control system includes receiving a data set of N samples that includes normal and unlabeled unidentified anomalous data samples, processing, via a model, the data set to produce an anomaly score associated with each sample in the data set, ranking the normal and anomalous data samples according to the anomaly score associated with each data sample to produce a ranked order, labeling a fraction α of the N samples that have the highest scores with an anomaly label and the remaining samples with a normal label, retraining the model using all N samples, the labels, and a joint loss function, repeating the processing, ranking, labeling, and retraining steps until the ranked order and labels for all of the N samples do not change, and outputting the trained model.

A device control system includes a controller. The controller may be configured to, receive a data set of N samples that includes normal and unlabeled unidentified anomalous data samples, process, via a model, the data set to produce an anomaly score associated with each sample in the data set, rank the normal and anomalous data samples according to the anomaly score associated with each data sample to produce a ranked order, label a fraction α of the N samples that have the highest scores with an anomaly label and the remaining samples with a normal label, retrain the model using all N samples, the labels, and a joint loss function, repeat the process, rank, label, and retrain steps until the ranked order and labels for all of the N samples do not change, and operate the device control system based on the trained model.

A system for performing at least one perception task associated with autonomous control of a vehicle, the system includes a processor and a memory. The memory includes instructions that, when executed by the processor, cause the processor to, receive a data set of N samples that includes normal and unlabeled unidentified anomalous data samples, process, via a model, the data set to produce an anomaly score associated with each sample in the data set, rank the normal and anomalous data samples according to the anomaly score associated with each data sample to produce a ranked order, label a fraction α of the N samples that have the highest scores with an anomaly label and the remaining samples with a normal label, retrain the model using all N samples, the labels, and a joint loss function, repeat the process, rank, label, and retrain steps until the ranked order and labels for all of the N samples do not change, and operate the vehicle based on the trained model.

DETAILED DESCRIPTION

Figure 1A:
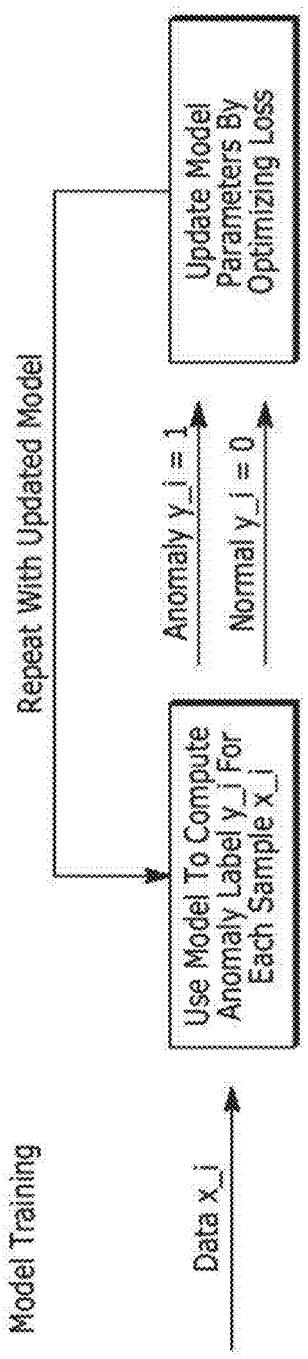
FIG. 1*a* depicts a block diagram of a model training system for anomaly detection.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

The term sensor refers to a device which detects or measures a physical property and records, indicates, or otherwise responds to it. The term sensor include an optical, light, imaging, or photon sensor (e.g., a charge-coupled device (CCD), a CMOS active-pixel sensor (APS), infrared sensor (IR), CMOS sensor), an acoustic, sound, or vibration sensor (e.g., microphone, geophone, hydrophone), an automotive sensor (e.g., wheel speed, parking, radar, oxygen, blind spot, torque, LIDAR), a chemical sensor (e.g., ion-sensitive field effect transistor (ISFET), oxygen, carbon dioxide, chemiresistor, holographic sensor), an electric current, electric potential, magnetic, or radio frequency sensor (e.g., Hall effect, magnetometer, magnetoresistance, Faraday cup, Galvanometer), an environment, weather, moisture, or humidity sensor (e.g., weather radar, actinometer), a flow, or fluid velocity sensor (e.g., mass air flow sensor, anemometer), an ionizing radiation, or subatomic particles sensor (e.g., ionization chamber, Geiger counter, neutron detector), a navigation sensor (e.g., a global positioning system (GPS) sensor, magneto hydrodynamic (MHD) sensor), a position, angle, displacement, distance, speed, or acceleration sensor (e.g., LIDAR, accelerometer, Ultra-wideband radar, piezoelectric sensor), a force, density, or level sensor (e.g., strain gauge, nuclear density gauge), a thermal, heat, or temperature sensor (e.g., Infrared thermometer, pyrometer, thermocouple, thermistor, microwave radiometer), or other device, module, machine, or subsystem whose purpose is to detect or measure a physical property and record, indicate, or otherwise respond to it.

Specifically, a sensor may measure properties of a time series signal and may include spatial or spatiotemporal aspects such as a location in space. The signal may include electromechanical, sound, light, electromagnetic, RF or other time series data. The technology disclosed in this application can be applied to time series imaging with other sensors, e.g., an antenna for wireless electromagnetic waves, microphone for sound, etc.

The term image refers to a representation or artifact that depicts perception of a physical characteristic (e.g., audible sound, visible light, Infrared light, ultrasound, underwater acoustics), such as a photograph or other two-dimensional picture, that resembles a subject (e.g., a physical object, scene, or property) and thus provides a depiction of it. An image may be multi-dimensional in that in may include components of time, space, intensity, concentration, or other characteristic. For example, an image may include a time series image. This technology can also be extended to image 3-D acoustic sources or objects.

Anomaly detection aims at identifying data points that show systematic deviations from the majority of data in an unlabeled dataset. A common assumption is that clean training data (free of anomalies) is available, which is often violated in practice. Here a strategy for training an anomaly detector in the presence of unlabeled anomalies that is compatible with a broad class of models is presented. The idea is to jointly infer binary labels to each datum (normal vs. anomalous) while updating the model parameters. The use of a combination of two losses that share parameters: one for the normal and one for the anomalous data is used. Then iteratively proceed with block coordinate updates on the parameters and the most likely (latent) labels. Experiments with several backbone models on three image datasets, 30 tabular data sets, and a video anomaly detection benchmark showed consistent and significant improvements over the baselines.

From industrial fault detection to medical image analysis or financial fraud prevention: Anomaly detection—the task of automatically identifying anomalous data instances without being explicitly taught how anomalies may look like—is critical in industrial and technological applications.

The common approach in deep anomaly detection is to first train a neural network on a large dataset of "normal" samples minimizing some loss function (such as a deep one class classifier) and to then construct an anomaly score from the output of the neural network (typically based on the training loss). Anomalies are then identified as data points with larger-than-usual anomaly scores and obtained by thresholding the score at particular values.

A standard assumption in this approach is that clean training data is available to teach the model what "normal" samples look like. In reality, this assumption is often violated as datasets are frequently large, uncurated, and may already contain some of the anomalies one is hoping to find. For example, a large dataset of medical images may already contain cancer images, or datasets of financial transactions could already contain unnoticed fraudulent activity. Naively training an unsupervised anomaly detector on such data may suffer from degraded performance.

In this disclosure, a new unsupervised approach to training anomaly detectors on a corrupted dataset is presented. Distinguishing normal from anomalous data by a set of binary labels, this disclosure jointly infers these labels and updates model parameters. This leads to a joint optimization problem over continuous model parameters and binary variables that is solved using alternating updates. When updating the binary variables, hold the model parameters fixed. When performing a gradient step on the model parameters, hold assignments into normal and anomalous data fixed.

Importantly, when updating model parameters, use a combination of two losses to optimally exploit the learning signal obtained from both normal and anomalous data. Since the resulting loss bears similarities with the "Outlier Exposure" loss that trains an anomaly detector in the presence of synthetic, known anomalies, this approach is referred to as latent outlier exposure (LOE) because the anomaly labels are latent variables (jointly inferred while training the model). Remarkably, this disclosure exploits that even unlabeled anomalies may provide a valuable training signal about their characteristic features.

This approach can be applied to a variety of anomaly detection loss functions and data types, as demonstrated on tabular, image, and video data. Beyond detection of entire anomalous images, it also considers the problem of anomaly segmentation which is concerned with finding anomalous regions within an image. Compared to established baselines that either ignore the anomalies or try to iteratively remove them, this approach yields significant performance improvements in all cases.

Deep anomaly detection. Deep learning has played an important role in recent advances in anomaly detection. However all the approaches assume a training dataset of "normal" data. However, in many practical scenarios there will be unlabeled anomalies hidden in the training data. Other prior art systems have shown that anomaly detection accuracy deteriorates when the training set is contaminated. This disclosure provides a training strategy that can increase accuracy with contaminated training data.

Anomaly Detection on contaminated training data. A common strategy to deal with contaminated training data is to hope that the contamination ratio is low and that the anomaly detection method will exercise inlier priority. Throughout this disclosure, the strategy of blindly training an anomaly detector as if the training data was clean is referred to as "Blind" training. Another term is a data refinement strategy that removes potential anomalies from the training data which is referred to as "Refine", that employs an ensemble of one-class classifiers to iteratively weed out anomalies and then to continue training on the refined dataset. Similar data refinement strategy may also combined with latent SVDD or autoencoders for anomaly detection. However, these methods fail to exploit the insight of outlier exposure that anomalies provide a valuable training signal. While outlier exposure assumes labeled anomalies, this disclosure aims at exploiting unlabeled anomalies in the training data.

This disclosure introduces a new unsupervised approach to training anomaly detectors on a corrupted dataset. By distinguishing normal from anomalous data by a set of binary labels, the system can jointly infer these labels and update model parameters. Importantly, when updating model parameters, use a combination of two losses to optimally exploit the learning signal obtained from both normal and anomalous data.

When updating model parameters, use a combination of two losses to optimally exploit the learning signal obtained from both normal and anomalous data. Remarkably, the unlabeled anomalies may provide a valuable training signal about their characteristic features. This approach can be applied to a variety of anomaly detection loss functions and data types.

In unsupervised anomaly detection it is typically assumed that the training data is clean (i.e., it contains no anomalies). For this reason, much time is spent to clean the data and to filter out anomalies. Typically, the model is then trained only on the clean data. This disclosure shows that this is suboptimal, and the concepts of this disclosure provides an improved training scheme.

Discarding the anomalies in the training data is suboptimal because it ignores valuable information that is available in the corrupted data. Instead, to exploit both the samples deemed normal and the anomalies. This is achieved by a combined loss with a complementary treatment of anomalies and normal samples. A deep learning model is trained to minimize this loss. The training alternates between assigning the training samples an anomaly label (anomaly/normal) and then optimizing the joint loss. This iterative training scheme leads to better anomaly detectors.

Problem Formulation. In the study of the problem of unsupervised (or self-supervised) anomaly detection, consider a data set of samples $x_i$; these could either come from a data distribution of "normal" samples, or could otherwise come from an unknown corruption process and thus be considered as "anomalies". For each datum $x_i$, let $y_i=0$ if the datum is normal, and $y_i=1$ if it is anomalous. Assume that these binary labels are unobserved, both in training and test sets, and have to be inferred from the data. In contrast to most anomaly detection setups, assume that the dataset is corrupted by anomalies. That means, assume that a fraction $(1-\alpha)$ of the data is normal, while its complementary fraction $\alpha$ is anomalous.

FIG. 1*a* depicts a block diagram of a model training system 100 for anomaly detection. The iterative training procedure repeatedly executes two steps: the model 102 receives a data set of N samples that includes normal and unidentified anomalous data samples. It processes the data, via a model to produce an anomaly score associated with each sample in the data set; It ranks the normal and anomalous data samples according to the anomaly score associated with each data sample to produce a ranked order; it labels a fraction $\alpha$ of the N samples that have the highest scores with an anomaly label and the remaining samples with a normal label. These labels (e.g. y_i=1, or y_i=0) are passed together with the data samples to update system 104 which consists of retraining the model using all N samples, the labels, and a joint loss function; the update model is passed back to the model 102: repeating the processing, ranking, labeling, and retraining steps until the ranked order and labels for all of the N samples do not change or another appropriate stopping criterion.

Figure 1B:
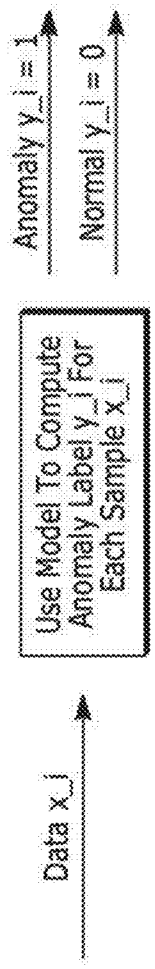
FIG. 1*b* depicts a block diagram of an anomaly detection system trained with the model training system.

FIG. 1*b* depicts a block diagram of an anomaly detection system 120 trained with the model training system. The model 102 receives a sample and processing it, via the model, computes a test anomaly score.

Proposed Method. Consider two losses. Similar to most work on deep anomaly detection, consider a loss function $$\mathcal{L}_n^\theta(x)$$

that aims to minimize over "normal" data. When being trained on only normal data, the trained loss will yield lower values for normal than for anomalous data so that it can be used to construct an anomaly score. In addition, consider a second loss for anomalies $$\mathcal{L}_a^\theta(x).$$

Minimizing this loss on only anomalous data will result in low loss values for anomalies and larger values for normal data. The anomaly loss is designed to have opposite effects on normal and anomalous data.

Temporarily assuming that all assignment variables y were known, consider the joint loss function, $$\mathcal{L}(\theta, y) = \sum_{i=1}^{N}(1-y_i)\mathcal{L}_n^\theta(x_i) + y_i\mathcal{L}_a^\theta(x_i). \tag{1}$$

Optimizing this function over its parameters $\theta$ yields a better anomaly detector than $L^\theta_n$ trained in isolation. By construction of the anomaly loss $\mathcal{L}_a^\theta$, the known anomalies provide an additional training signal to $\mathcal{L}_n^\theta$:

due to parameter sharing, the labeled anomalies teach $\mathcal{L}_n^\theta$ where not to expect normal data in feature space. Assume that the set of $y_i$ is unobserved, hence latent. Therefore, the term this approach of jointly inferring the latent assignment variables y and learning the parameters θ is latent outlier exposure (LOE).

Optimization Problem. Seek to both optimize both losses' shared parameters θ while also optimizing the most likely assignment variables $y_i$. Due to the assumption of having a fixed rate of anomalies α in the training data, introduce a constrained set:

$$y = \left\{ y \in \{0, 1\}^N : \sum_{i=1}^{N} y_i = \alpha N \right\}. \tag{2}$$

The set describes a "hard" label assignment; hence the name "Hard LOE ($LOE_H$)". Note that the system may require αN to be an integer.

Since the goal is to use the losses $\mathcal{L}_n^\theta$ and $\mathcal{L}_a^\theta$ to identify and score anomalies, seek $\mathcal{L}_n^\theta(x_i) - \mathcal{L}_a^\theta(x_i)$ to be large for anomalies, and $\mathcal{L}_a^\theta(x_i) - \mathcal{L}_n^\theta(x_i)$ to be large for normal data. Assuming these losses to be optimized over θ, the system may best guess to identify anomalies to minimize eq. (1) over the assignment variables y. Combining this with the constraint (eq. (2)) yields the following minimization problem:

$$\min_{\theta} \min_{y \in y} \mathcal{L}(\theta, y) \tag{3}$$

Block coordinate descent. Although the constraint discrete optimization problem may seem worry some at first, it has an elegant solution. To this end, consider a sequence of parameters $\theta^t$ and labels $y^t$ and proceed with alternating updates. To update θ, simply fix $y^t$ and minimize $L(\theta, y^t)$ over θ. In practice, consider performing a single gradient step (or stochastic gradient step, see below), yielding a partial update.

To update y given $\theta^t$, minimize the same function subject to the constraint (eq. (2)). To this end, define training anomaly scores, $$S_i^{train} = \mathcal{L}_n^\theta(x_i) - \mathcal{L}_a^\theta(x_i). \tag{4}$$

These scores quantify the effect of $y_i$ on minimizing eq. (1). Rank these scores and assign the (1−α)-quantile of the associated labels $y_i$ to the value 0, and the remainder (α) to the value 1. This minimizes the loss function subject to the label constraint. Assuming that all involved losses are bounded from below, the block coordinate descent converges to a local optimum since every update improves the loss.

Algorithm 1 summarizes our approach.

| Algorithm 1: Training process of LOE |
|---|
| Input: Contaminated training dataset D ($\alpha_0$ anomaly rate)hyperparameter α |
| Model: Deep anomaly detector with parameters θ |
| foreach Epochdo |
| I foreach Mini-batch M do |
| I I Calculate the anomaly score $S_i^{train}$ for $x_i \in M$ |
| I I Estimate the label $y_i$ given $S_i^{train}$ and α |
| I I Update the parameters θ by minimizing L(θ,y) |
| I end |
| end |

Anomaly Detection. In order to use this approach for finding anomalies in a test set, one could in principle proceed as during training and infer the most likely labels. However, in practice one may not want to assume to encounter the same kinds of anomalies that was encountered during training. Hence, refrain from using $\mathcal{L}_a^\theta$ during testing and score anomalies using only $\mathcal{L}_n^\theta$.

Note that due to parameter sharing, training $\mathcal{L}_a^\theta$ jointly with $\mathcal{L}_n^\theta$ has already led to the desired information transfer between both losses.

Define the testing anomaly score in terms of the "normal" loss function, $$S_i^{test} = \mathcal{L}_n^\theta(x_i). \tag{5}$$

Extension and Examples In practice, the block coordinate descent procedure can be overconfident in assigning y, leading to suboptimal training. To overcome this problem, this disclosure presents a soft anomaly scoring approach that is termed Soft LOE ($LOE_S$). Soft LOE is very simply implemented by a modified constraint set:

$$y' = \left\{ y \in \{0, 0.5\}^N : \sum_{i=1}^{N} y_i = 0.5\,\alpha N \right\}. \tag{6}$$

Everything else about the model's training and testing scheme remains the same.

The consequence of an identified anomaly $y_i=0.5$ is to minimize an equal combination of both losses, $$0.5(\mathcal{L}_n^\theta(x_i) + \mathcal{L}_a^\theta(x_i)).$$

The interpretation is that the algorithm is uncertain about whether to treat $x_i$ as a normal or anomalous data point, and compromises between both cases.

Below is a review of several loss functions that are compatible with this approach.

Multi-Head RotNet (MHRot). Multi-Head RotNet (MHRot) learns a multi-head classifier $f_\theta$ to predict the applied image transformations including rotation, horizontal shift, and vertical shift. Denote K combined transformations as $\{T_1, \ldots, T_K\}$. The classifier has three softmax heads, each for a classification task l, modeling the prediction distribution of a transformed image $p^l(\cdot|f_\theta, T_k(x))$ (or $p^l_k(\cdot|x)$ for brevity). Aiming to predict the correct transformations for normal samples, maximize the log-likelihoods of the ground truth label $t^l_k$ for each transformation and each head; for anomalies, make the predictions evenly distributed by minimizing the cross entropy from a uniform distribution U to the prediction distribution, resulting in $$\mathcal{L}_n^\theta(x) := -\sum_{k=1}^{K}\sum_{l=1}^{3} \log p_k^l(t_k^l \mid x), \tag{7}$$

$$\mathcal{L}_a^\theta(x) := \sum_{k=1}^{K}\sum_{l=1}^{3} CE(\mathcal{U}, p_k^l(\cdot \mid x))$$

Neural Transformation Learning (NTL). Rather than using hand-crafted transformations, anomaly detection using neural transformations (NTL) learns K neural transformations $\{T_{\theta,1}, \ldots, T_{\theta,K}\}$ and an encoder $f_\theta$ parameterized by $\theta$ from data and uses the learned transformations to detect anomalies. Each neural transformation generates a view $x_k=T_{\theta,k}(x)$ of sample x. For normal samples, NTL encourages each transformation to be similar to the original sample and to be dissimilar from other transformations. To achieve this objective, NTL maximizes the normalized probability $p_k=h(x_k,x)/(h(x_k,x)+\Sigma_{l\neq k}h(x_k,x_l))$ for each view where $h(a,b)=\exp(\cos(f_\theta(a),f_\theta(b))/\tau)$ measures the similarity of two views where $\tau$ is the temperature and $\cos(a,b):=ab/\|a\|\|b\|$. For anomalies, the system may "flip" the objective for normal samples: the model instead pulls the transformations close to each other and pushes them away from the original view, resulting in $$\mathcal{L}_n^\theta(x) := -\sum_{k=1}^{K} \log p_k, \tag{8}$$

$$\mathcal{L}_a^\theta(x) := -\sum_{k=1}^{K} \log(1 - p_k).$$

Internal Contrastive Learning (ICL). Anomaly detection with internal contrastive learning (ICL) is a state-of-the-art tabular anomaly detection methods. Assuming that the relations between a subset of the features (table columns) and the rest are class-dependent, ICL is able to learn an anomaly detector by discovering the feature relations for a specific class. With this in mind, ICL learns to maximize the mutual information between the two complementary feature subsets, a(x) and b(x), in the encoder space. The maximization of the mutual information is equivalent to minimizing a contrastive loss $$\mathcal{L}_n^\theta(x) := -\sum_{k=1}^{K} \log p_k \text{ with } p_k = h(a_k(x), b_k(x)) / \sum_{l=1}^{k} h(a_l(x), b_k(x))$$

where $h(a,b)=\exp(\cos(f_\theta(a),g_\theta(b))/\tau)$ measures the similarity between two feature subsets in the encoder space. For anomalies, the system may flip the objective as $$\mathcal{L}_a^\theta(x) := -\sum_{k=1}^{K} \log(1 - p_k).$$

Toy Example: is an analysis of the methods in a controlled setup on a synthetic data set. For the sake of visualization, created a 2D contaminated data set with a three-component Gaussian mixture. One larger component serves as normality distribution, and the two smaller components generate anomalies contaminating the normal samples (see FIG. 2). For simplicity, the anomaly detector is the deep one-class classifier using a radial basis function network as the backbone model. Setting the contamination rate to $\alpha_0=\alpha=0.1$, the baselines "Blind" and "Refine" were compared with the proposed $LOE_H$ and $LOE_S$ and the theoretically optimal G-truth method (which uses the ground truth labels).

Figure 2A:
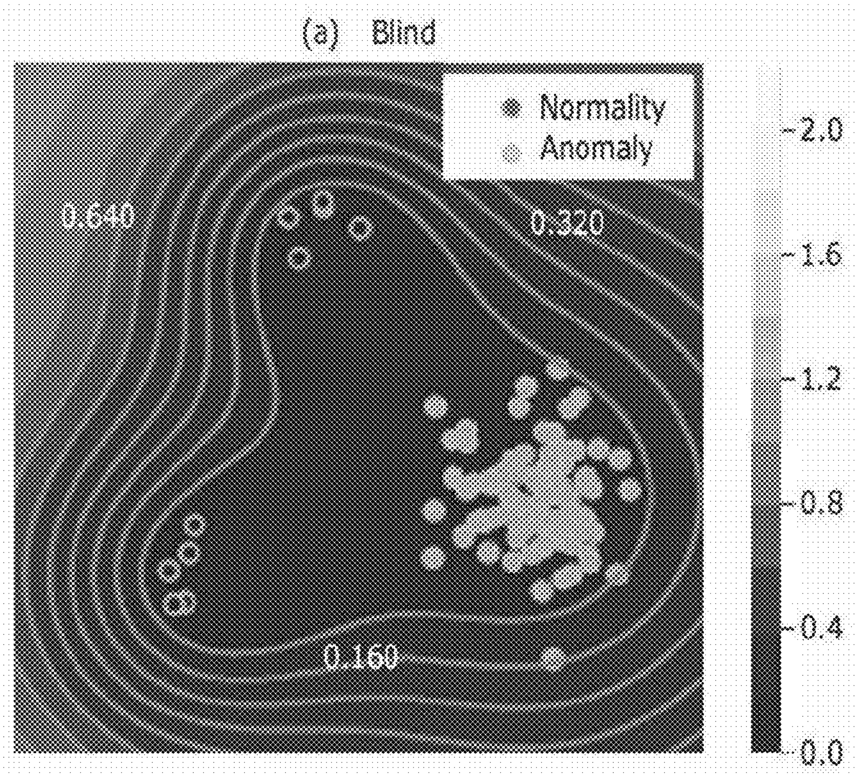
FIG. 2*a* depicts a graphical representation of output data from a system trained on contaminated data in which the system trained "Blindly" in which all data is treated as normal.
Figure 2B:
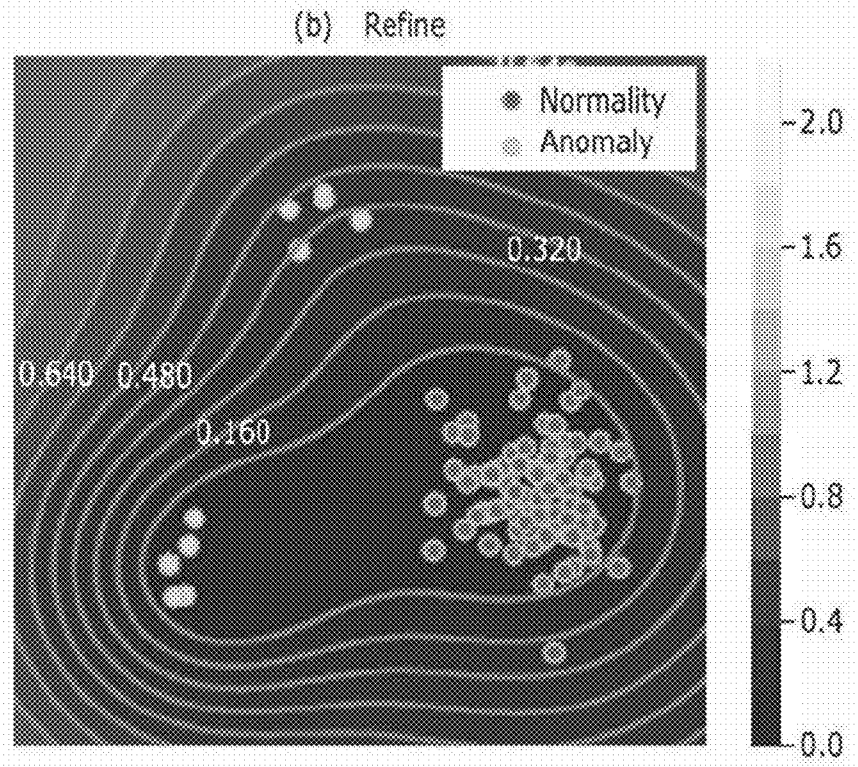
FIG. 2*b* depicts a graphical representation of output data from a system trained on contaminated data in which the trained system was "Refined" in which some anomalies were filtered out.
Figure 2C:
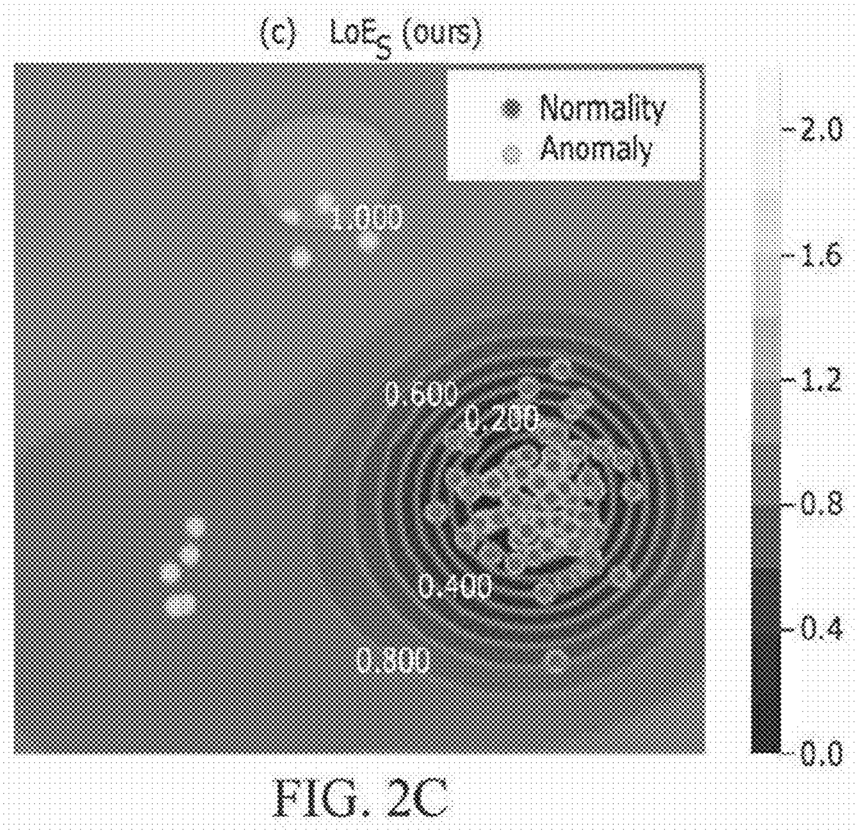
FIG. 2*c* depicts a graphical representation of output data from a system trained on contaminated data in which the system trained $LOE_S$.
Figure 2D:
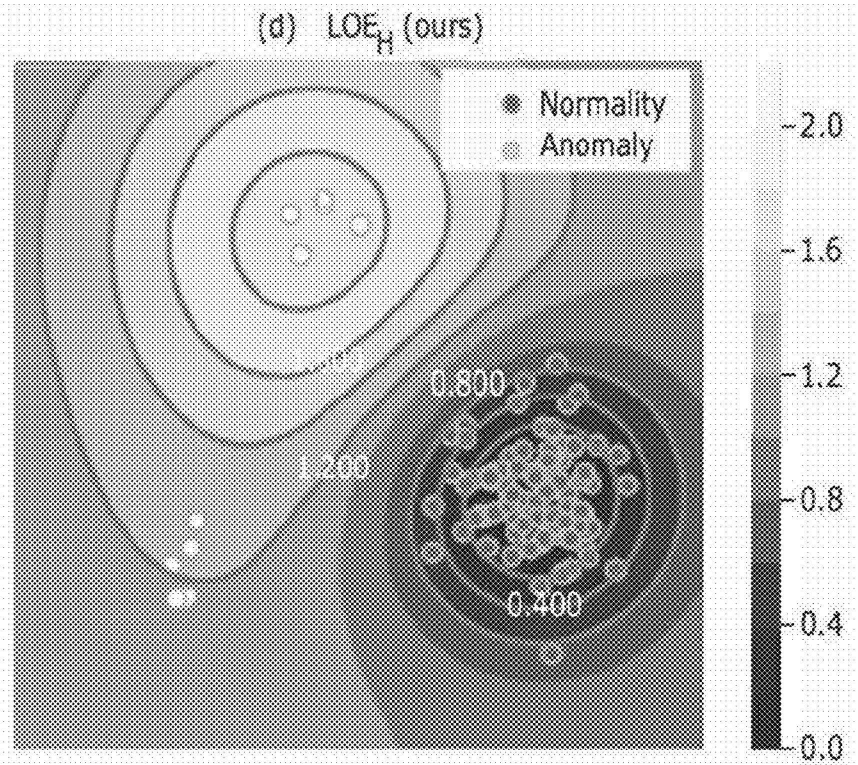
FIG. 2*d* depicts a graphical representation of output data from a system trained on contaminated data in which the system trained $LOE_H$.
Figure 2E:
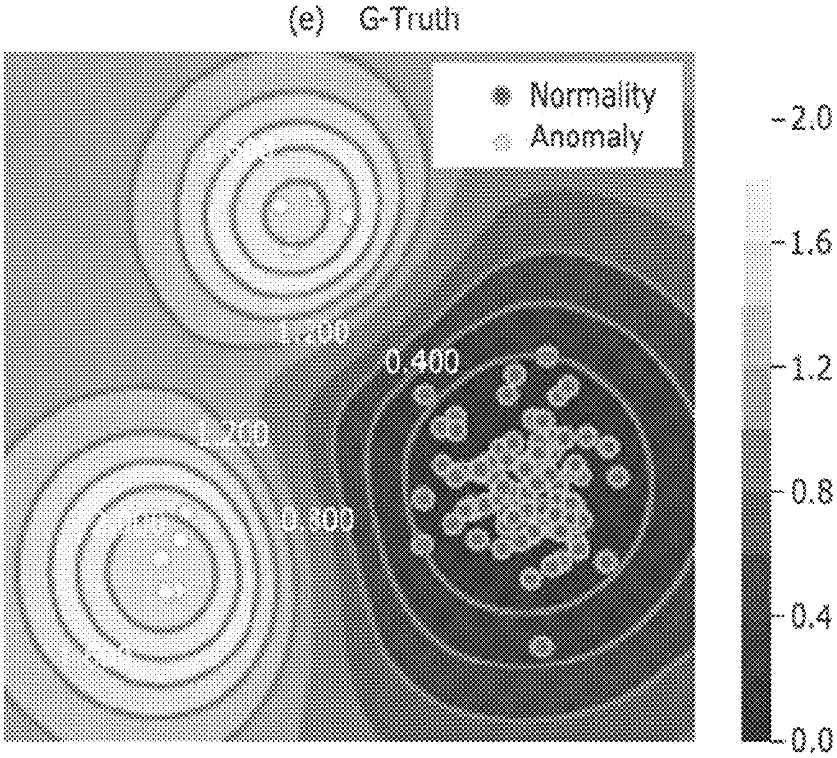
FIG. 2*e* depicts a graphical representation of output data from a system trained on contaminated data in which the system trained as supervised anomaly.

FIG. 2*a* depicts a graphical representation of output data 200 from a system trained on contaminated data in which the system is trained "Blindly" in which all data is treated as normal. Normal data 202 and anomalous data 204 is shown along with contours lines 206 that are areas with the same score. FIG. 2*b* depicts a graphical representation of output data 220 from a system trained on contaminated data in which the trained system was "Refined" in which some anomalies were filtered out. FIG. 2*c* depicts a graphical representation of output data 240 from a system trained on contaminated data in which the system trained $LOE_S$. $LOE_S$ assigns soft labels to anomalies. FIG. 2*d* depicts a graphical representation of output data 260 from a system trained on contaminated data in which the system trained $LOE_H$. $LOE_H$ assigns hard labels to anomalies. FIG. 2*e* depicts a graphical representation of output data 280 from a system trained on contaminated data in which the system trained as supervised anomaly.

FIG. 2 shows the results (anomaly-score contour lines after training). With more latent anomaly information exploited from (a) to (e), the contour lines become increasingly accurate. While (a) "Blind" erroneously treats all anomalies normal, (b) "Refine" improves by filtering out some anomalies. (c) $LOE_S$ and (d) $LOE_H$ utilize the anomalies in the normality model building, resulting in a clear separation of anomalies and normalities. $LOE_H$ leads to more pronounced boundaries than $LOE_S$, but it is at risk of overfitting to incorrectly-detected "anomalies". G-truth approximately recovers the true contours.

Experiments on Image Data: Anomaly detection on images is especially far developed. This demonstrates LOE's benefits when combined with two leading image anomaly detection backbones trained on contaminated datasets: MHRot and NTL. To verify that LOE can mitigate the performance drop caused by the training on contaminated image data, an experiment with three image datasets: CIFAR-10, FashionMNIST, and MVTEC is shown.

Backbone models and baselines. The experiment with MHRot and NTL. In consistency with previous work, train MHRot on raw images and NTL on features output by an encoder pre-trained on ImageNet. NTL is built upon the final pooling layer of a pre-trained ResNet152 for CIFAR-10 and F-MNIST, and upon the third residual block of a pre-trained WideResNet50 for MVTEC. Adopt the two proposed LOE methods (presented above) and the two baseline methods "Blind" and "Refine" to both backbone models.

Image datasets. On CIFAR-10 and F-MNIST, follow the standard "one-vs.-rest" protocol of converting these data into anomaly detection datasets. This means create number-of-classes many anomaly detection tasks, with each task considering one of the classes as normal and the union of all other classes as abnormal. For each task, mix a fraction of $\alpha_0$ abnormal samples into the normal training set. Since the MVTEC training set contains no anomalies, artificially create them by adding zero-mean Gaussian noise to anomalies borrowed from the test set.

Results. Table 1 presents the experiment results of CIFAR-10 and F-MNIST in Table 1, where the system may set the contamination ratio $\alpha_0=\alpha=0.1$. The results are reported as the mean and standard deviation of three runs with different model initialization and anomaly samples for the contamination. The number in the brackets is the average performance difference from the model trained on clean data. The disclosed methods consistently outperform the baselines and mitigate the gap from the model trained on clean data. Specifically, with NTL, LOE significantly improves over the best performing baseline, "Refine", by 1.4% and 3.8% AUC on CIFAR-10 and F-MNIST, respectively. On CIFAR-10, our methods have only 0.8% AUC lower than when training on the normal dataset. When using another state-of-the-art method MHRot on raw images, the disclosed LOE methods outperform the baselines by about 2% AUCs on both datasets.

TABLE 1

AUC (%) with standard deviation for anomaly detection on CIFAR-10 and F-MNIST. For all experiments, the system may set the contamination ratio as 10%. LOE mitigates the performance drop when NTL and MHRot trained on the contaminated datasets.

| | | CIFAR-10 | F-MNIST |
|---|---|---|---|
| NTL | Blind | 91.3 ± 0.1 (−4.4) | 85.0 ± 0.2 (−9.7) |
| | Refine | 93.5 ± 0.1 (−2.2) | 89.1 ± 0.2 (−5.6) |
| | $LOE_H$ | 94.9 ± 0.2 (−0.8) | 92.9 ± 0.7 (−1.8) |
| | $LOE_S$ | 94.9 ± 0.1 (−0.8) | 92.5 ± 0.1 (−2.2) |
| MHRot | Blind | 84.0 ± 0.5 (−4.2) | 88.8 ± 0.1 (−4.9) |
| | Refine | 84.4 ± 0.1 (−3.8) | 89.6 ± 0.2 (−4.1) |
| | $LOE_H$ | 86.4 ± 0.5 (−1.8) | 91.4 ± 0.2 (−2.3) |
| | $LOE_S$ | 86.3 ± 0.2 (−1.9) | 91.2 ± 0.4 (−2.5) |

TABLE 2

AUC (%) with standard deviation of NTL for anomaly detection/segmentation on MVTEC. The system may set the contamination ratio of the training set as 10% and 20%.

| | Detection | | Segmentation | |
|---|---|---|---|---|
| | 10% | 20% | 10% | 20% |
| Blind | 94.2 ± 0.5 (−3.2) | 89.4 ± 0.3 (−8.0) | 96.17 ± 0.08 (−0.78) | 95.09 ± 0.17 (−1.86) |
| Refine | 95.3 ± 0.5 (−2.1) | 93.2 ± 0.3 (−4.2) | 96.55 ± 0.04 (−0.40) | 96.09 ± 0.06 (−0.86) |
| $LOE_H$ | 95.9 ± 0.9 (−1.5) | 92.9 ± 0.4 (−4.5) | 95.97 ± 0.22 (−0.98) | 93.29 ± 0.21 (−3.66) |
| $LOE_S$ | 95.4 ± 0.5 (−2.0) | 93.6 ± 0.3 (−3.8) | 96.56 ± 0.04 (−0.39) | 96.11 ± 0.05 (−0.84) |

Figure 3A:
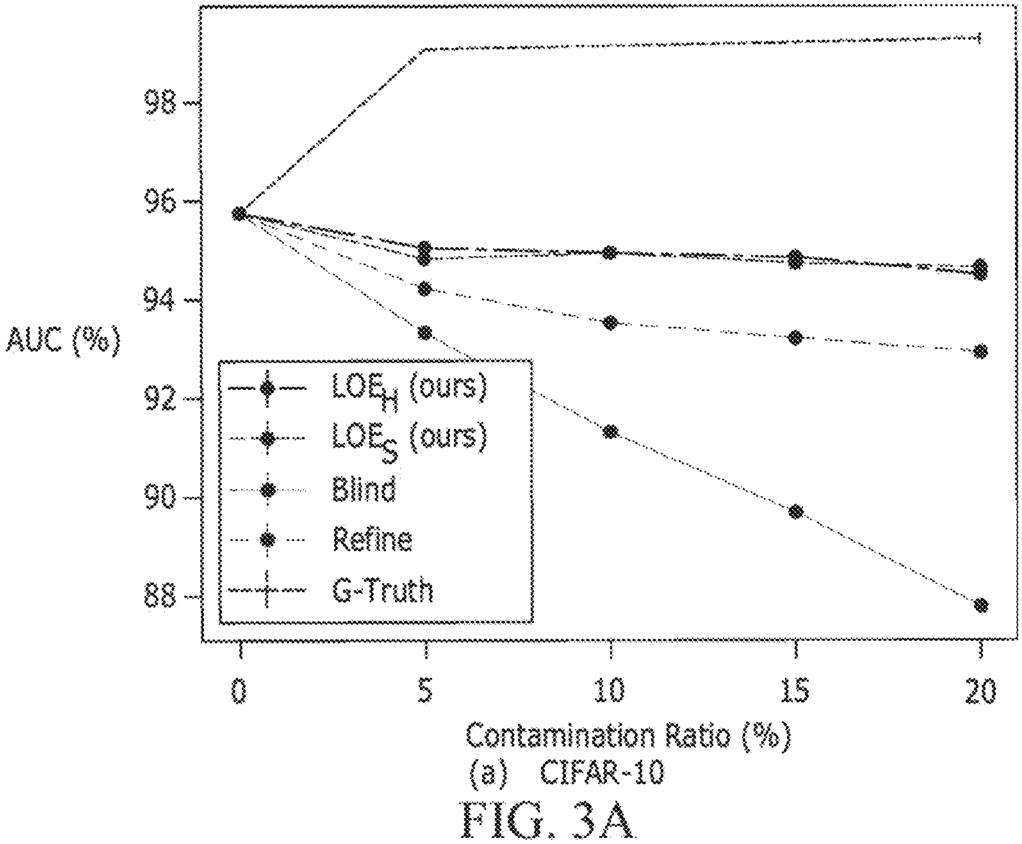
FIG. 3*a* depicts a graphical representation of AUC (%) in relation to contamination ratio for CIFAR-10.
Figure 3B:
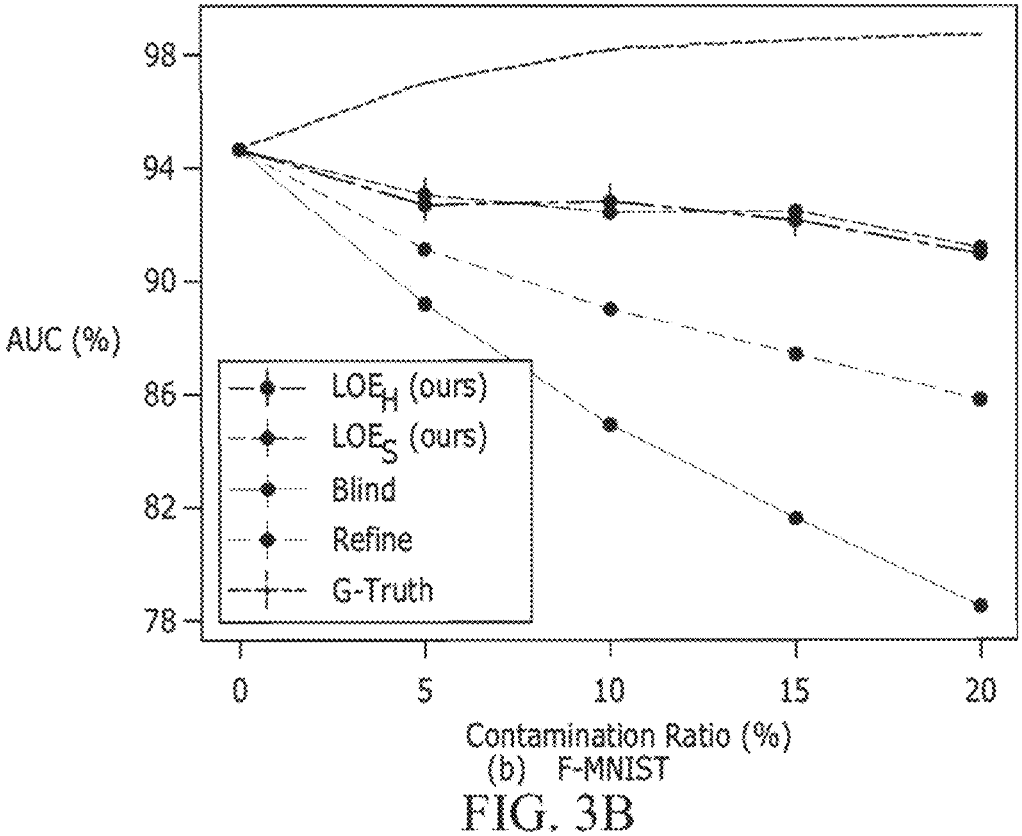
FIG. 3*b* depicts a graphical representation of AUC (%) in relation to contamination ratio for F-MNIST.

FIG. 3*a* depicts a graphical representation 300 of an Area Under the Curve (AUC) 302 (%) in relation to a contamination ratio 304 for CIFAR-10. FIG. 3*b* depicts a graphical representation 320 of AUC 302 (%) in relation to contamination ratio 304 for F-MNIST.

This disclosure was evaluated with NTL at various contamination ratios in FIG. 3 (*a*) and (*b*). One can see 1) adding labeled anomalies (G-truth) boosts performance, and 2) among all methods that do not have ground truth labels, the proposed LOE methods achieve the best performance consistently at all contamination ratios.

Also shown is experiments on anomaly detection and segmentation on the MVTEC dataset. The results are shown in Table 2, illustrating the evaluation of the methods at two contamination ratios (10% and 20%). The disclosed method improves over the "Blind" and "Refine" baselines in all experimental settings.

Experiments on Tabular Data. Tabular data is another important application area of anomaly detection. Many data sets in the healthcare and cybersecurity domains are tabular. This comprehensive empirical disclosure demonstrates that LOE yields the best performance for two popular backbone models and a comprehensive set of contaminated tabular datasets.

Tabular datasets. Although over 30 tabular datasets were evaluated, including the frequently-studied small-scale Arrhythmia and Thyroid medical datasets, the large-scale cyber intrusion detection datasets KDD and KDDRev, and multi-dimensional point datasets from the outlier detection datasets. The study included pre-processing and traintest split of the datasets. To corrupt the training set, anomalies were taken from the test set and zero-mean Gaussian noise was added to them.

Backbone models and baselines. Consider two advanced deep anomaly detection methods for tabular data: NTL and ICL. For NTL, consider nine transformation and a multi-layer perceptron for both transformations and the encoder on all datasets. For ICL, consider the proposed LOE methods ($LOE_H$ and $LOE_S$) and the "Blind" and "Refine" baselines with both backbone models.

Results. F1-scores for 30 tabular datasets are shown in Table 3. The results are reported as the mean and standard derivation of five runs with different model initializations and random training set split. The contamination ratio was set to $\alpha_0=\alpha=0.1$ for all datasets.

TABLE 3

| | NTL | | | | ICL | | | |
|---|---|---|---|---|---|---|---|---|
| | Blind | Refine | $LOE_H$ | $LOE_S$ | Blind | Refine | $LOE_H$ | $LOE_S$ |
| abalone | 37.9 ± 13.4 | 55.2 ± 15.9 | 42.8 ± 26.9 | 59.3 ± 12.0 | 50.9 ± 1.5 | 54.3 ± 2.9 | 53.4 ± 5.2 | 51.7 ± 2.4 |
| annthyroid | 29.7 ± 3.5 | 42.7 ± 7.1 | 47.7 ± 11.4 | 50.3 ± 4.5 | 29.1 ± 2.2 | 38.5 ± 2.1 | 48.7 ± 7.6 | 43.0 ± 8.8 |
| arrhythmia | 57.6 ± 2.5 | 59.1 ± 2.1 | 62.1 ± 2.8 | 62.7 ± 3.3 | 53.9 ± 0.7 | 60.9 ± 2.2 | 62.4 ± 1.8 | 63.6 ± 2.1 |
| breastw | 84.0 ± 1.8 | 93.1 ± 0.9 | 95.6 ± 0.4 | 95.3 ± 0.4 | 92.6 ± 1.1 | 93.4 ± 1.0 | 96.0 ± 0.6 | 95.7 ± 0.6 |
| cardio | 21.8 ± 4.9 | 45.2 ± 7.9 | 73.0 ± 7.9 | 57.8 ± 5.5 | 50.2 ± 4.5 | 56.2 ± 3.4 | 71.1 ± 3.2 | 62.2 ± 2.7 |
| ecoli | 0.0 ± 0.0 | 88.9 ± 14.1 | 100.0 ± 0.0 | 100.0 ± 0.0 | 17.8 ± 15.1 | 46.7 ± 25.7 | 75.6 ± 4.4 | 75.6 ± 4.4 |
| forest cover | 20.4 ± 4.0 | 56.2 ± 4.9 | 61.1 ± 34.9 | 67.6 ± 30.6 | 9.2 ± 4.5 | 8.0 ± 3.6 | 6.8 ± 3.6 | 11.1 ± 2.1 |
| glass | 11.1 ± 7.0 | 15.6 ± 5.4 | 17.8 ± 5.4 | 20.0 ± 8.3 | 8.9 ± 4.4 | 11.1 ± 0.0 | 11.1 ± 7.0 | 8.9 ± 8.3 |
| ionosphere | 89.0 ± 1.5 | 91.0 ± 2.0 | 91.0 ± 1.7 | 91.3 ± 2.2 | 86.5 ± 1.1 | 85.9 ± 2.3 | 85.7 ± 2.8 | 88.6 ± 0.6 |
| kdd | 95.9 ± 0.0 | 96.0 ± 1.1 | 98.1 ± 0.4 | 98.4 ± 0.1 | 99.3 ± 0.1 | 99.4 ± 0.1 | 99.5 ± 0.0 | 99.4 ± 0.0 |
| kddrev | 98.4 ± 0.1 | 98.4 ± 0.2 | 89.1 ± 1.7 | 98.6 ± 0.0 | 97.9 ± 0.5 | 98.4 ± 0.4 | 98.8 ± 0.1 | 98.2 ± 0.4 |
| letter | 36.4 ± 3.6 | 44.4 ± 3.1 | 25.4 ± 10.0 | 45.6 ± 10.6 | 43.0 ± 2.5 | 51.2 ± 3.7 | 54.4 ± 5.6 | 47.2 ± 4.9 |
| lympho | 53.3 ± 12.5 | 60.0 ± 8.2 | 60.0 ± 13.3 | 73.3 ± 22.6 | 43.3 ± 8.2 | 60.0 ± 8.2 | 80.0 ± 12.5 | 83.3 ± 10.5 |
| mammogra. | 5.5 ± 2.8 | 2.6 ± 1.7 | 3.3 ± 1.6 | 13.5 ± 3.8 | 8.8 ± 1.9 | 11.4 ± 1.9 | 34.0 ± 20.2 | 42.8 ± 17.6 |
| mnist tabular | 78.6 ± 0.5 | 80.3 ± 1.1 | 71.8 ± 1.8 | 76.3 ± 2.1 | 72.1 ± 1.0 | 80.7 ± 0.7 | 86.0 ± 0.4 | 79.2 ± 0.9 |
| mulcross | 45.5 ± 9.6 | 58.2 ± 3.5 | 58.2 ± 6.2 | 50.1 ± 8.9 | 70.4 ± 13.4 | 94.4 ± 6.3 | 100.0 ± 0.0 | 99.9 ± 0.1 |
| musk | 21.0 ± 3.3 | 98.8 ± 0.4 | 100.0 ± 0.0 | 100.0 ± 0.0 | 6.2 ± 3.0 | 100.0 ± 0.0 | 100.0 ± 0.0 | 100.0 ± 0.0 |
| optdigits | 0.2 ± 0.3 | 1.5 ± 0.3 | 41.7 ± 45.9 | 59.1 ± 48.2 | 0.8 ± 0.5 | 1.3 ± 1.1 | 1.2 ± 1.0 | 0.9 ± 0.5 |
| pendigits | 5.0 ± 2.5 | 32.6 ± 10.0 | 79.4 ± 4.7 | 81.9 ± 4.3 | 10.3 ± 4.6 | 30.1 ± 8.5 | 80.3 ± 6.1 | 88.6 ± 2.2 |
| pima | 60.3 ± 2.6 | 61.0 ± 1.9 | 61.3 ± 2.4 | 61.0 ± 0.9 | 58.1 ± 2.9 | 59.3 ± 1.4 | 63.0 ± 1.0 | 60.1 ± 1.4 |
| satellite | 73.6 ± 0.4 | 74.1 ± 0.3 | 74.8 ± 0.4 | 74.7 ± 0.1 | 72.7 ± 1.3 | 72.7 ± 0.6 | 73.6 ± 0.2 | 73.2 ± 0.6 |
| satimage | 26.8 ± 1.5 | 86.8 ± 4.0 | 90.7 ± 1.1 | 91.0 ± 0.7 | 7.3 ± 0.6 | 85.1 ± 1.4 | 91.3 ± 1.1 | 91.5 ± 0.9 |
| seismic | 11.9 ± 1.8 | 11.5 ± 1.0 | 18.1 ± 0.7 | 17.1 ± 0.6 | 14.9 ± 1.4 | 17.3 ± 2.1 | 23.6 ± 2.8 | 24.2 ± 1.4 |
| shuttle | 97.0 ± 0.3 | 97.0 ± 0.2 | 97.1 ± 0.2 | 97.0 ± 0.2 | 96.6 ± 0.2 | 96.7 ± 0.1 | 96.9 ± 0.1 | 97.0 ± 0.2 |
| speech | 6.9 ± 1.2 | 8.2 ± 2.1 | 43.3 ± 5.6 | 50.8 ± 2.5 | 0.3 ± 0.7 | 1.6 ± 1.0 | 2.0 ± 0.7 | 0.7 ± 0.8 |
| thyroid | 43.4 ± 5.5 | 55.1 ± 4.2 | 82.4 ± 2.7 | 82.4 ± 2.3 | 45.8 ± 7.3 | 71.6 ± 2.4 | 83.2 ± 2.9 | 80.9 ± 2.5 |
| vertebral | 22.0 ± 4.5 | 21.3 ± 4.5 | 22.7 ± 11.0 | 25.3 ± 4.0 | 8.9 ± 3.1 | 8.9 ± 4.2 | 7.8 ± 4.2 | 10.0 ± 2.7 |
| vowels | 36.0 ± 1.8 | 50.4 ± 8.8 | 62.8 ± 9.5 | 48.4 ± 6.6 | 42.1 ± 9.0 | 60.4 ± 7.9 | 81.6 ± 2.9 | 74.4 ± 8.0 |
| wbc | 25.7 ± 12.3 | 45.7 ± 15.5 | 76.2 ± 6.0 | 69.5 ± 3.8 | 50.5 ± 5.7 | 50.5 ± 2.3 | 61.0 ± 4.7 | 61.0 ± 1.9 |
| wine | 24.0 ± 18.5 | 66.0 ± 12.0 | 90.0 ± 0.0 | 92.0 ± 4.0 | 4.0 ± 4.9 | 10.0 ± 8.9 | 98.0 ± 4.0 | 100.0 ± 0.0 |

F1-score (%) for anomaly detection on 30 tabular datasets.
$\alpha_0 = \alpha = 10\%$ was set in all experiments.
LOE outperforms the "Blind" and "Refine" consistently.

LOE outperforms the "Blind" and "Refine" baselines consistently. Remarkably, on some datasets, LOE trained on contaminated data can achieve better results than on clean data, suggesting that the latent anomalies provide a positive learning signal. This effect can be seen when increasing the contamination ratio on the Arrhythmia and Thyroid datasets (FIG. 3 (*c*) and (*d*)). Overall, LOE improves the performance of anomaly detection methods on contaminated tabular datasets significantly.

Figure 3C:
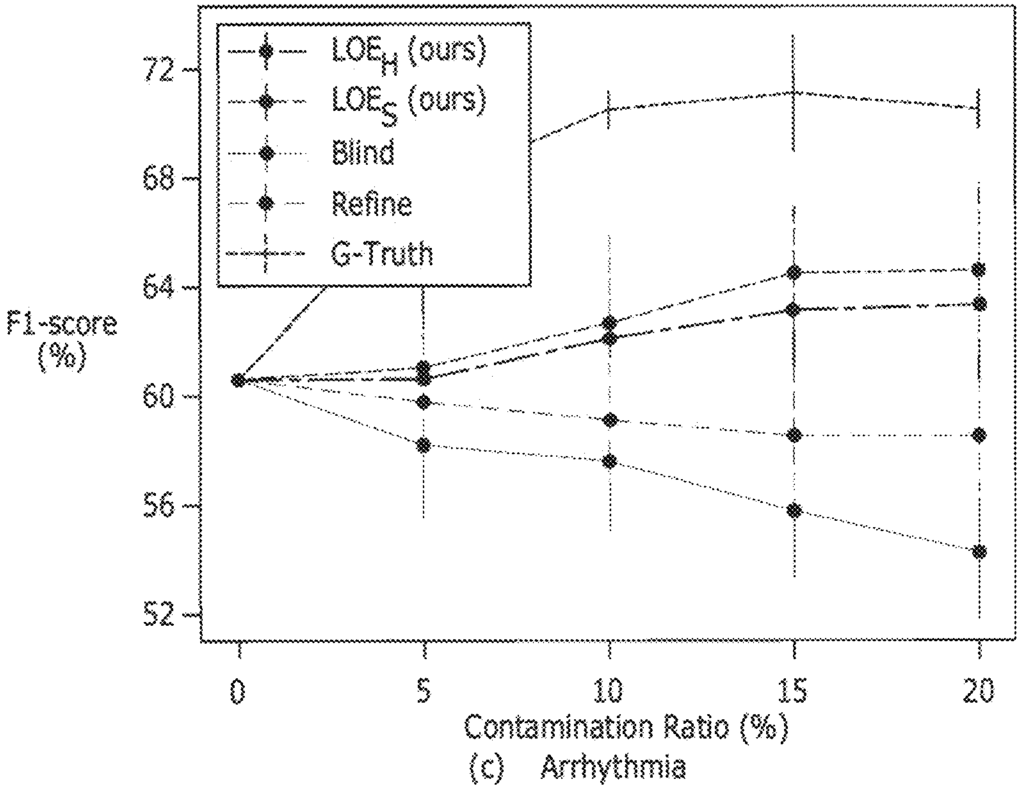
FIG. 3*c* depicts a graphical representation of F1-score (%) in relation to contamination ratio for Arrhythmia data set.
Figure 3D:
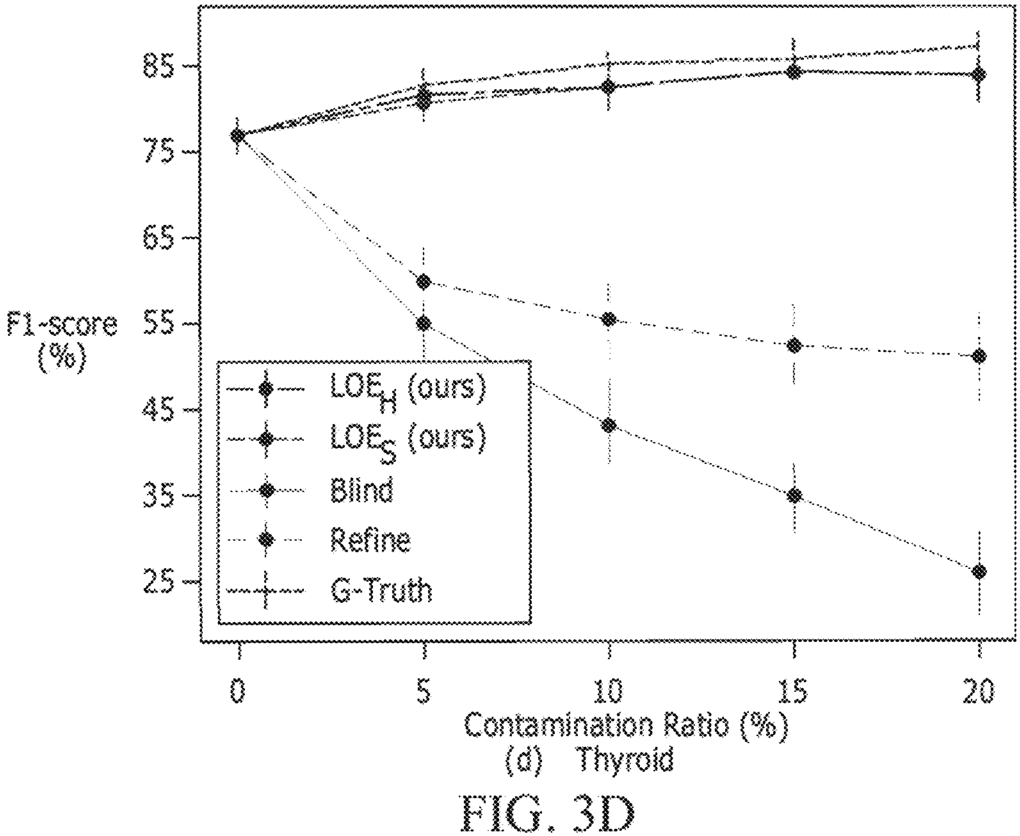
FIG. 3*d* depicts a graphical representation of F1-score (%) in relation to contamination ratio for Thyroid data set.

FIG. 3*c* depicts a graphical representation 340 of F1-score 306(%) in relation to contamination ratio for Arrhythmia data set. The F1-score 306 is a measure of the precision based on a threshold. FIG. 3*d* depicts a graphical representation 360 of F1-score 306(%) in relation to contamination ratio for Thyroid data set.

In addition to image and tabular data, the methods were evaluated on a video frame anomaly detection system. The goal is to identify video frames that contain unusual objects or abnormal events. Treating frames as independent and exchangeable results in a dataset of sets of video frames (one for each clip) that are mixtures of normal and abnormal frames. The methods presented here achieve state-of-the-art performance on this benchmark.

Video dataset. Consider UCSD Peds1, a popular benchmark dataset for video anomaly detection. It contains surveillance videos of a pedestrian walkway and labels non-pedestrians and unusual behavior as abnormal. The data set contains 34 training video clips and 36 testing video clips, where all frames in the training set are normal and about half of the testing frames are abnormal. Preprocessing the data by dividing the data into training and test sets. To realize different contamination ratios, some abnormal frames were randomly removed from the training set, but the test set was held fixed.

Backbone models and baselines. In addition to the "Blind" and "Refine" baselines, a comparison of a ranking-based state-of-the-art method for video frame anomaly detection and all baselines was considered. By implementing the proposed LOE methods and the "Blind", "Refine" baselines with NTL as the backbone model using a pre-trained ResNet50 on ImageNet as a feature extractor, whose output is then sent into an NTL. The feature extractor and NTL are jointly optimized during training.

Results. The Soft LOE method achieves the best performance across different contamination ratios. The methods disclosed improve Deep Ordinal Regression by 18.8% and 9.2% AUC for the contamination ratios 10% and 20%, respectively. $LOE_S$ outperforms the "Blind" and "Refine" significantly.

Sensitivity Study. The hyperparameter $\alpha$ characterizes the assumed fraction of anomalies in our training data. Here, the system may evaluate its robustness under different truth contamination ratios. The system may run $LOE_H$ and $LOE_S$ with NTL on CIFAR-10 with varying true anomaly ratios $\alpha_0$ and different hyperparameters $\alpha$. The system may present the results in a matrix accommodating the two variables. The diagonal values report the results when correctly setting the contamination ratio. $LOE_H$ (FIG. 4*a*) shows a considerable robustness with at most 1.4% performance degradation and still outperforming "Refine" (Table 1) when the hyperparameter $\alpha$ is off by 5%. $LOE_S$ (FIG. 4*b*) also shows robustness, especially when erroneously setting a larger $\alpha$ than the true ratio $\alpha_0$. For example, $LOE_S$ is always better than the "Refine" (Table 1) when the assumed $\alpha$ is larger than the true ratio $\alpha_0$.

FIG. 4. A sensitivity study of the robustness of LOE to the mis-specified contamination ratio. The system may evaluate LOE with NTL on CIFAR-10 in terms of AUC. LOE yields robust results.

Figure 4A:
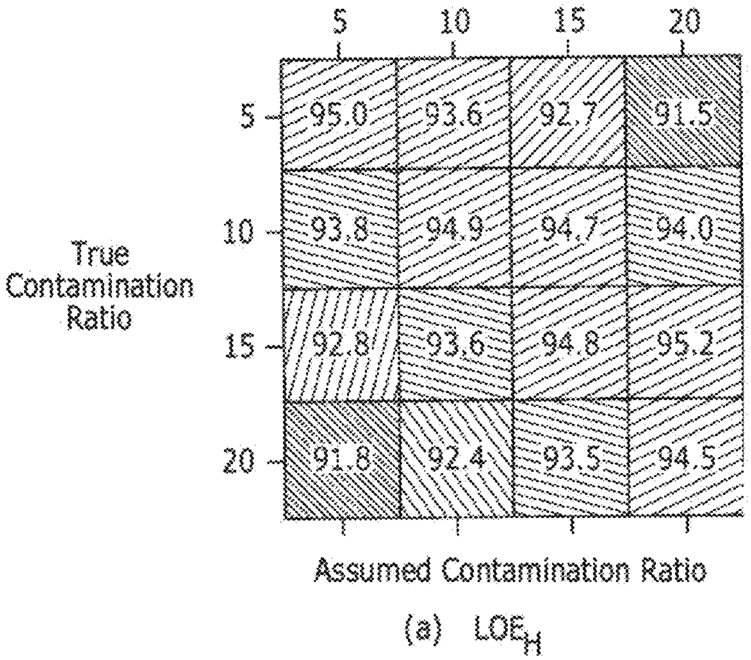
FIG. 4*a* depicts a graphical representation of true contamination ratio in relation to assumed contamination ratio for $LOE_H$.
Figure 4B:
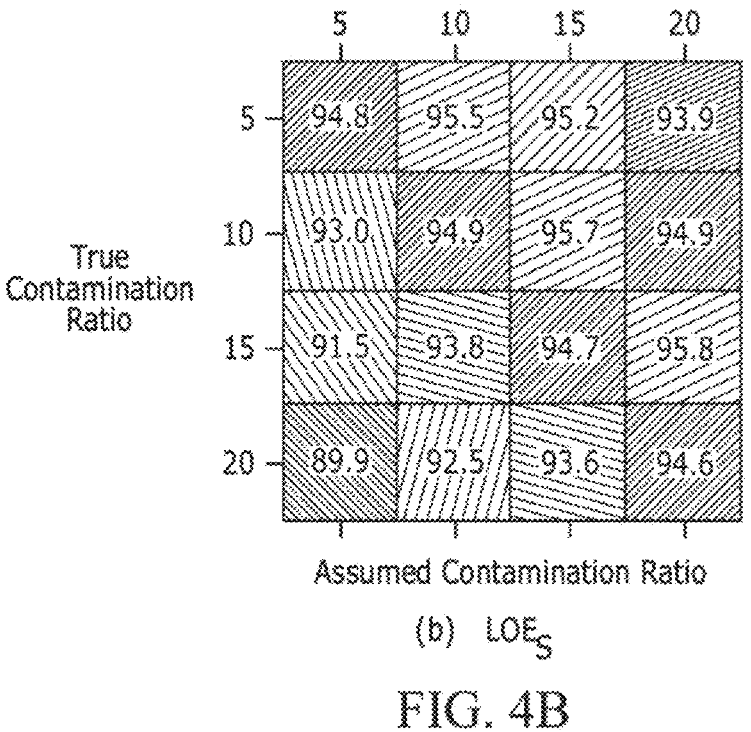
FIG. 4*b* depicts a graphical representation of true contamination ratio (%) in relation to assumed contamination ratio for $LOE_S$.

FIG. 4*a* depicts a graphical representation 400 of true contamination ratio 402(%) in relation to assumed contamination ratio 404 for $LOE_H$. FIG. 4*b* depicts a graphical representation 450 of true contamination ratio 402(%) in relation to assumed contamination ratio 404 for $LOE_S$. Note the number in each square is an AUC score.

Applications: The applications of the technology disclosed in this disclosure includes Detecting anomalies in DNA/RNA sequences. (e.g. in single cell data detect abnormal balance of RNA loads that can be indicative that a cell is unhealthy and might be diseased).

Detecting anomalies based on medical measurements (e.g., time series data such as ECG, EEG, and other tabular data) in which different attributes/anomalies may trigger an alarm in in a nursing station, ICU, or at a remote location.

Detecting machine failures in a manufacturing system or automobile system based on sensor data. The detection of an anomaly may result in the system going into a safe mode, or providing a warning.

Detecting cyber-attacks occurring in signature-based tools, such as financial fraud detection.

Detecting network intrusion, such as abnormal behavior on network, to initiate security measures.

Detecting abnormal system behavior in a self-driving system, and in response to anomalous data, alert passenger/driver to take back control of the vehicle, control the acceleration/deceleration, control the steering, or send data to other vehicles.

Monitoring manufacturing production (e.g. of transistors in an integrated circuit, ICs on wafers, impurities in steel production, production of automotive electronics, consumer electronic components, appliances, etc.) and when quality is abnormal, sort-out, stop production, or trigger human inspection. The anomaly detection can be either on the level of the sensor measurements (e.g., of the production line) or potentially combining multiple types of sensor measurements into a multi-dimensional time series, or further the anomaly detection may be based on inspection of the produced product (e.g. for IC manufacturing, different aspects of the chips can be measured such as voltage or resistance). All these measurements can be put together into 'tabular data' where each sample corresponds to one wafer, IC, etc. and the entries in the columns are all the measurements. Still extending this further, the methods and systems presented can also be applied to images produced by a camera (optical inspection).

Anomaly Detection for process data. Manufacturing deals a lot with process data. For example, screw-driving an assembly of one screw only yields a lot of process data like timestamp, angle or torque. Even though the resulting signals look very similar from screw to screw, they typically do not have same length. Typically, the numbers of rotations differ until the individual screw threads match. Sampling rate can also different. Assume it is expected to be one sample per 10 ms. While sometimes the time delta is 8 ms, the next one can be 12 ms. It's even possible that one recording gets lost such that the system may have a delta of about 20 ms. As our anomaly detector fits on both, static tabular data as well as time series data, it perfectly fits for this kind of application. Besides screw driving, other manufacturing processes like welding can be investigated. These methods and systems can be applied to these applications as well.

In another example, such as an automated vehicle, the described active-learning algorithm establishes desirable scenarios for which video images (or alternative sensors, see above) are to be collected. Video images take by the vehicle's video camera are then analyzed, a scenario depicted in said image is classified (e.g. by detecting and classifying objects in said image). If said depicted scenario corresponds to said desired scenario, the image is then transmitted to a back-end computer which collects such images from many vehicles and use these images to train a machine-learning system, e.g. an image classifier, which is then updated within the automated vehicle.

In another example, such as a connected physical system, e.g. a connected automated vehicle, the anomaly detector as described above is used to detect whether a selected frame of predefined length (e.g. 5 s) from an acceleration sensor time series exhibits an anomaly. If it does, this data frame is transmitted to a back-end computer where it may be used to define e.g. corner-cases for testing the ML system in accordance with the output of which the connected physical system is operated.

Figure 5:
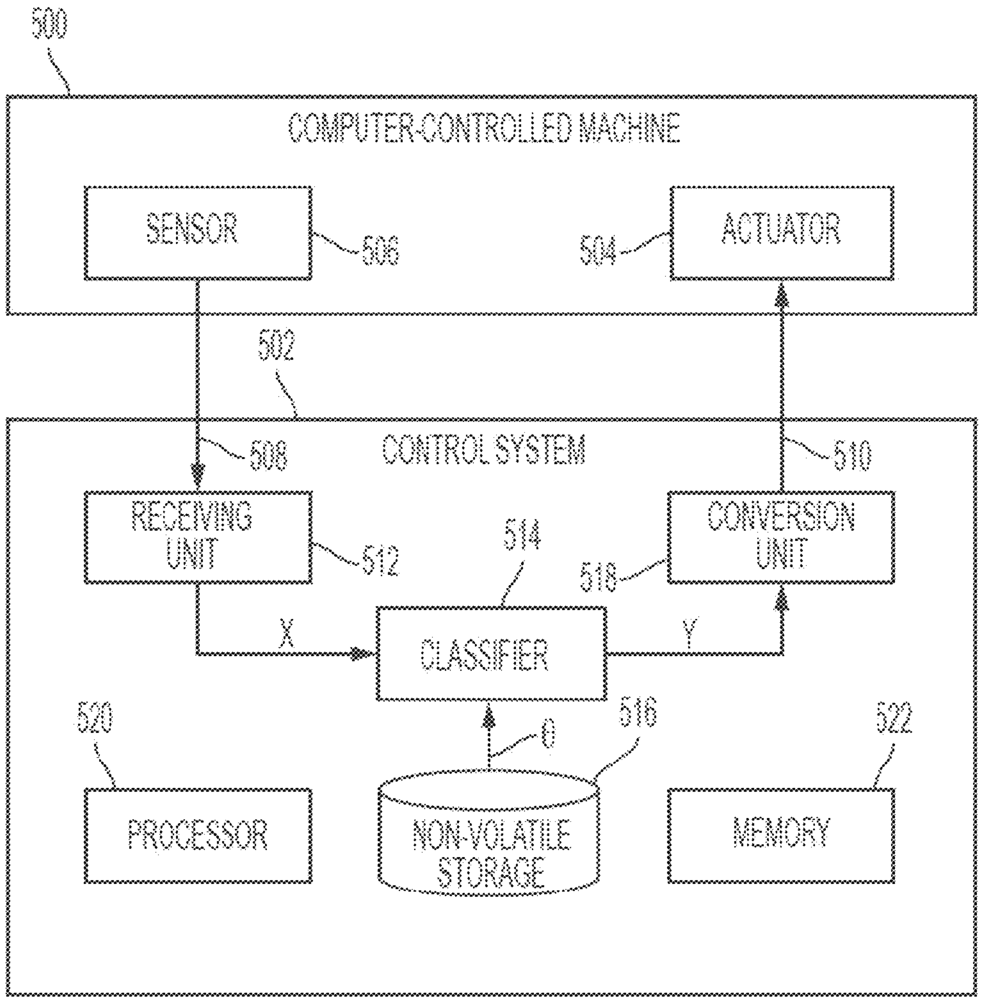
FIG. 5 depicts a schematic diagram of an interaction between a computer-controlled machine and a control system, according to the principles of the present disclosure.

FIG. 5 depicts a schematic diagram of an interaction between computer-controlled machine 500 and control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In some embodiments, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes classifier 514. Classifier 514 may be configured to classify input signals x into one or more labels using a machine learning (ML) algorithm, such as a neural network described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In some embodiments, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In some embodiments, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., ML algorithms) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
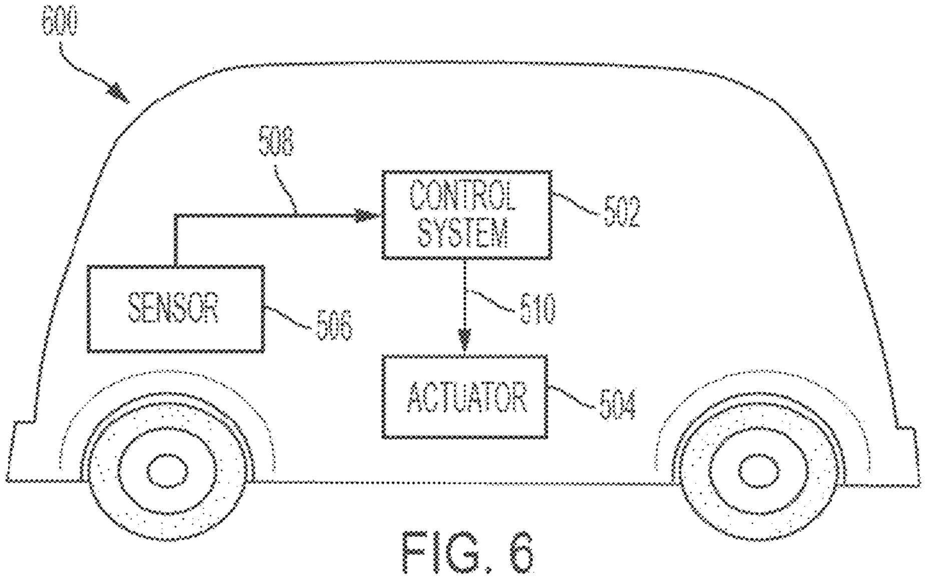
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to the principles of the present disclosure.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In some embodiments, the vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In some embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In some embodiments, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
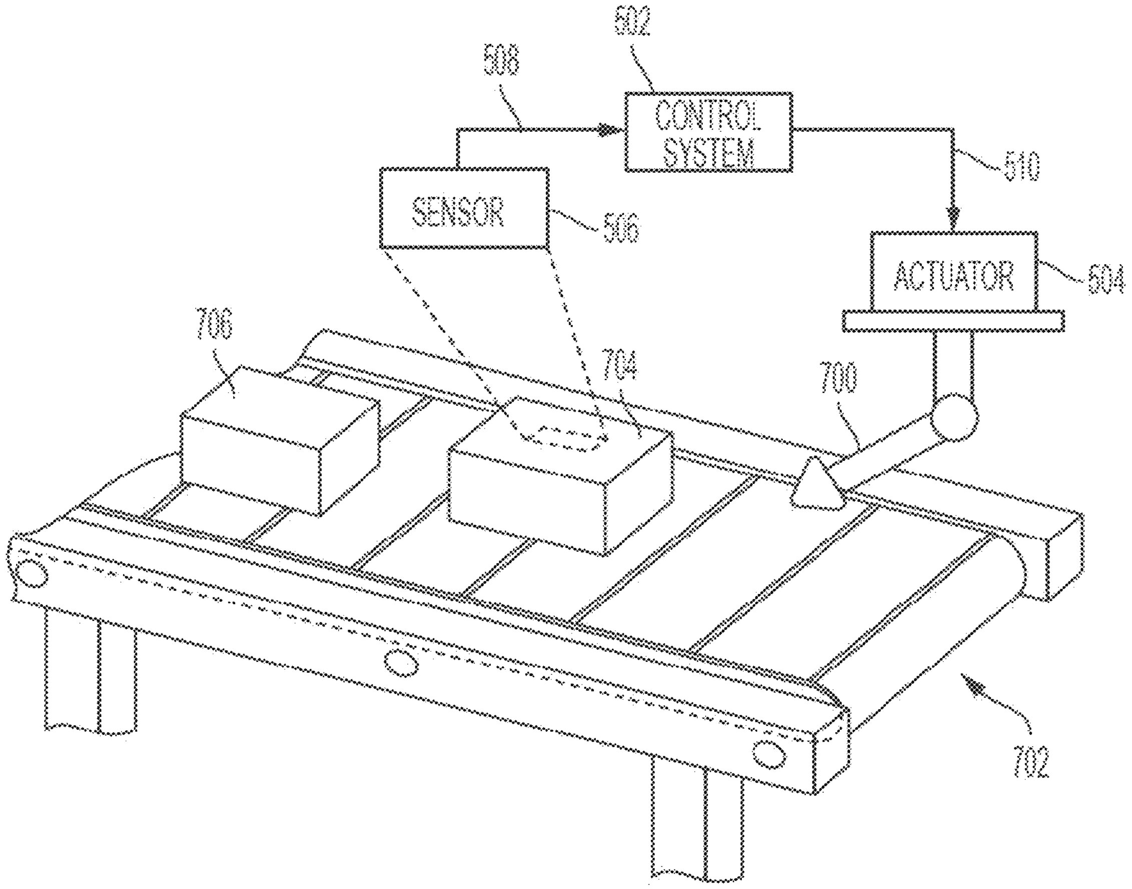
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 706 of system 700 (e.g., manufacturing machine) depending on the determined state of manufactured product 704.

Figure 8:
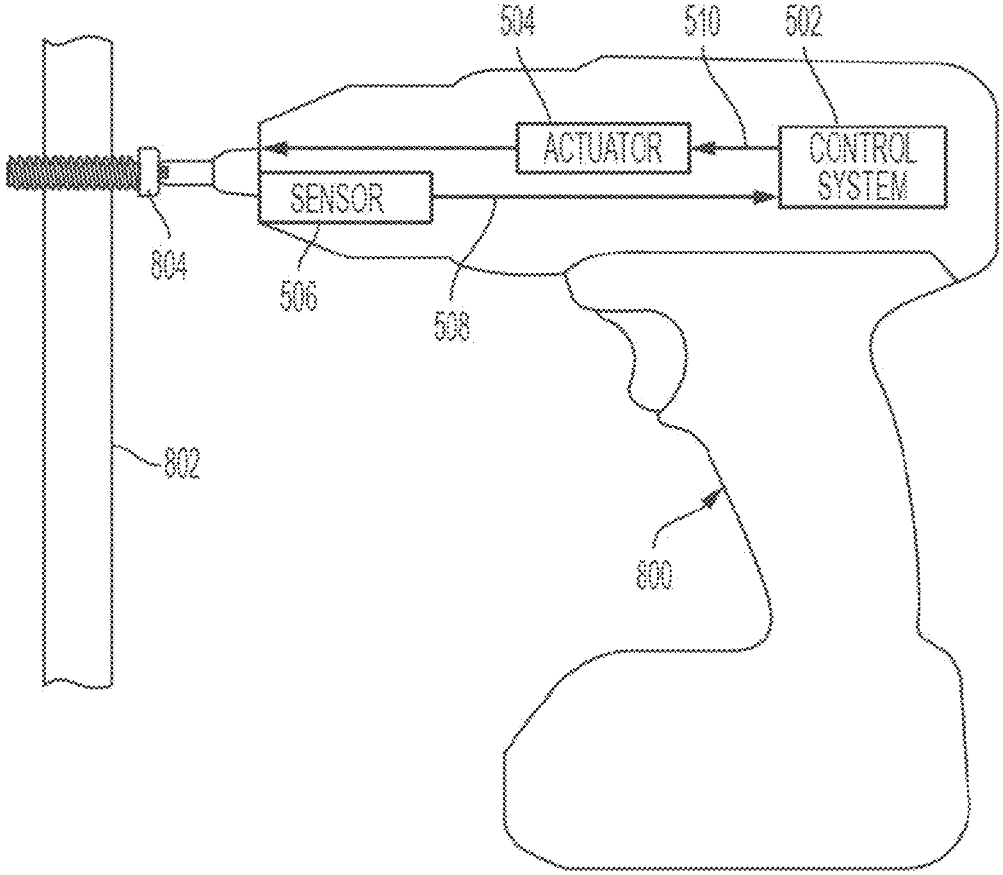
FIG. 8 depicts a schematic diagram of the control system of FIG. 5 configured to control a power tool, such as a power drill or driver that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
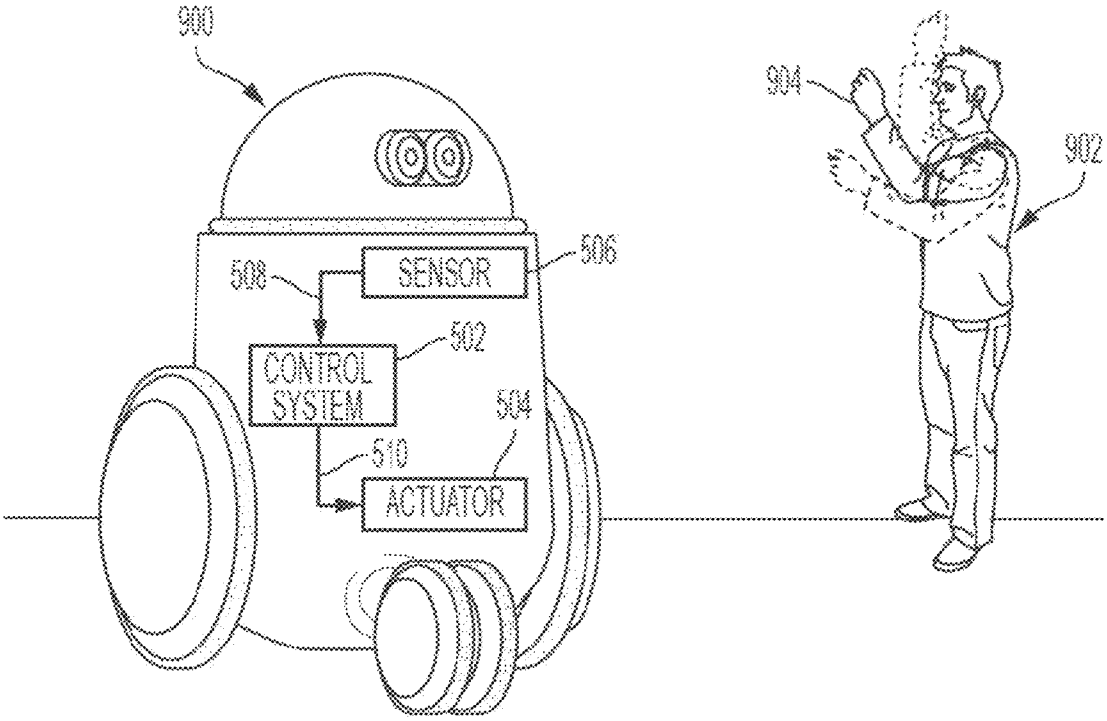
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
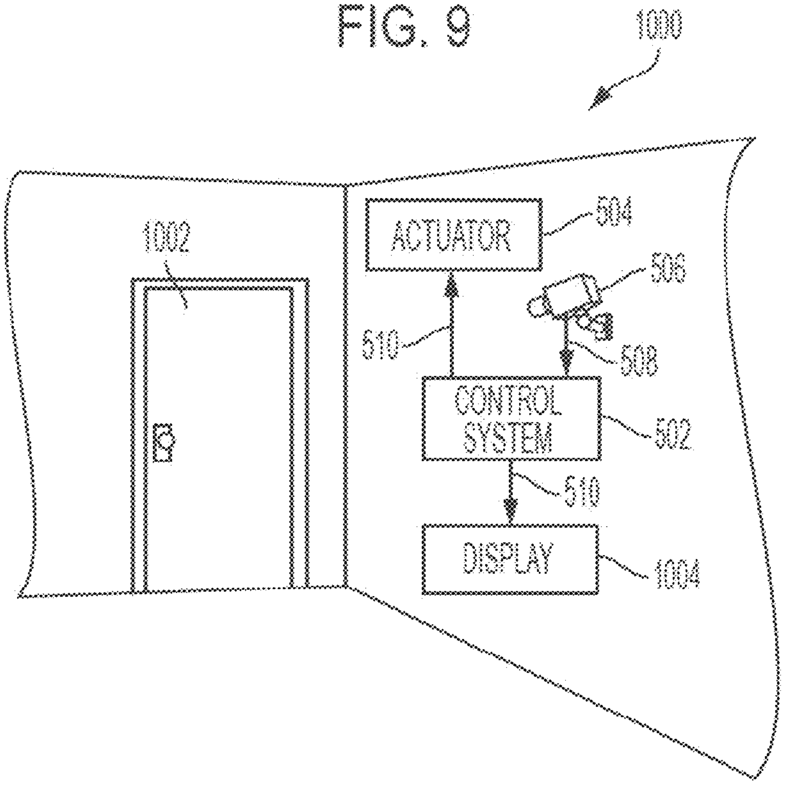
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In some embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
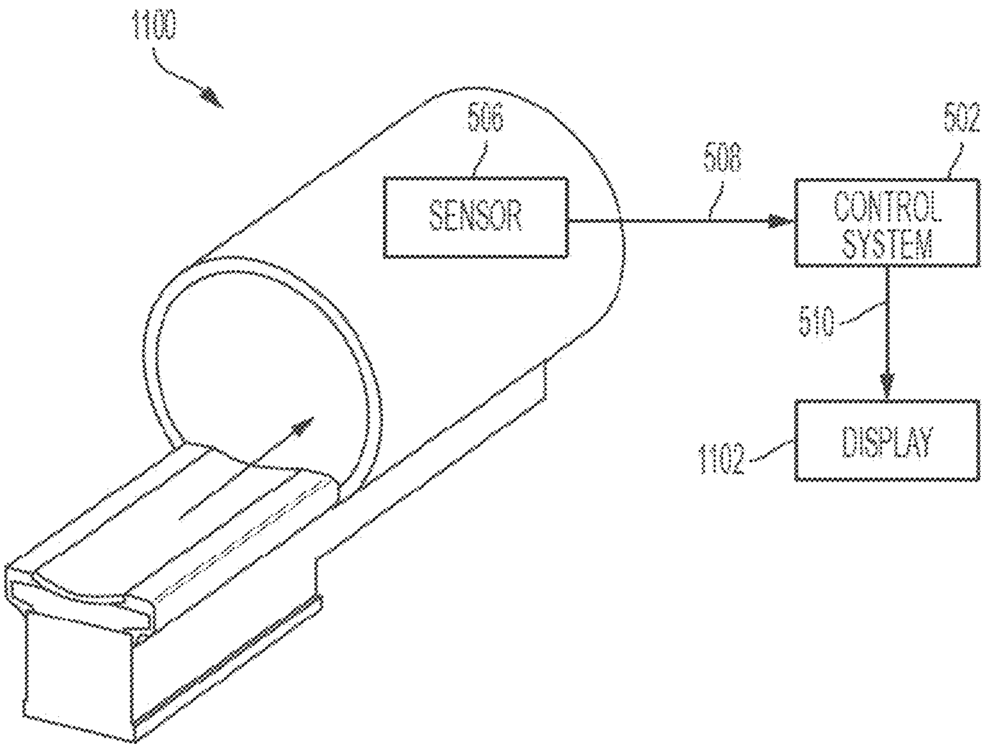
FIG. 11 depicts a schematic diagram of the control system of FIG. 5 configured to control an imaging system, for example an MM apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

In some embodiments a method for performing at least one perception task associated with autonomous control of a vehicle includes receiving a first dataset, the first dataset including plurality of images corresponding to at least one environment of the vehicle and identifying a first object category of objects associated with the plurality of images, the first object category including a plurality of object types. The method also includes identifying a current statistical distribution of a first object type of the plurality of object types and determining a first distribution difference between the current statistical distribution of the first object type and a standard statistical distribution associated with the first object category. The method also includes, in response to a determination that the first distribution difference is greater than a threshold, generating first object type data corresponding to the first object type. The method also includes configuring at least one attribute of the first object type data and generating a second dataset by augmenting the first dataset using the first object type data.

In some embodiments, the at least one attribute of the first object type data includes a location attribute. In some embodiments, the at least one attribute of the first object type data includes an orientation attribute. In some embodiments, the method also includes generating two-dimensional object data based on the first object type data. In some embodiments, augmenting the first dataset using the first object type data includes augmenting the first dataset to include the two-dimensional object data. In some embodiments, the method also includes generating three-dimensional object data based on the first object type data. In some embodiments, augmenting the first dataset using the first object type data includes augmenting the first dataset to include the three-dimensional object data. In some embodiments, the method also includes fusing two-dimensional object data associated with the first object type data with corresponding three-dimensional object data associated with the first object type data. In some embodiments, augmenting the first dataset using the first object type data includes augmenting the first dataset based on the fused two-dimensional object data and the three-dimensional object data. In some embodiments, the standard statistical distribution corresponds to a data distribution of the first object category. In some embodiments, the method also includes performing, by a machine learning model trained using the second dataset, at least one perception task associated with autonomous control of the vehicle.

In some embodiments, a system for performing at least one perception task associated with autonomous control of a vehicle includes a processor and a memory. The memory includes instructions that, when executed by the processor, cause the processor to: receive a first dataset, the first dataset including plurality of images corresponding to at least one environment of the vehicle; identify a first object category of objects associated with the plurality of images, the first object category including a plurality of object types; identify a current statistical distribution of a first object type of the plurality of object types; determine a first distribution difference between the current statistical distribution of the first object type and a standard statistical distribution associated with the first object category; in response to a determination that the first distribution difference is greater than a threshold, generate first object type data corresponding to the first object type; configure at least one attribute of the first object type data; and generate a second dataset by augmenting the first dataset using the first object type data.

In some embodiments, the at least one attribute of the first object type data includes a location attribute. In some embodiments, the at least one attribute of the first object type data includes an orientation attribute. In some embodiments, the instructions further cause the processor to augment the first dataset further using two-dimensional object data associated with the first object type data. In some embodiments, the instructions further cause the processor to augment the first dataset further using three-dimensional object data associated with the first object type data. In some embodiments, the instructions further cause the processor to augment the first dataset further using fused two-dimensional object data and three-dimensional object data associated with the first object type data. In some embodiments, the standard statistical distribution corresponds to a data distribution of the first object category. In some embodiments, the instructions further cause the processor to train a machine learning model trained using the second dataset, the machine learning model being configured to perform at least one perception task associated with autonomous control of the vehicle.

In some embodiments, an apparatus for performing at least one perception task associated with autonomous control of a vehicle includes a processor and a memory. The memory includes instructions that, when executed by the processor, cause the processor to: receive a first dataset, the first dataset including plurality of images corresponding to at least one environment of the vehicle; identify a first object category of objects associated with the plurality of images, the first object category including a plurality of object types; identify a current statistical distribution of a first object type of the plurality of object types; determine a first distribution difference between the current statistical distribution of the first object type and a standard statistical distribution that corresponds to a data distribution of the first object category; in response to a determination that the first distribution difference is greater than a threshold, generate first object type data corresponding to the first object type; configure at least one attribute of the first object type data; generate a second dataset by augmenting the first dataset using the first object type data; and train a machine learning model trained using the second dataset, the machine learning model being configured to perform at least one perception task associated with autonomous control of the vehicle.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of training a control system comprising:

receiving a data set of N samples that includes normal and unlabeled unidentified anomalous data samples, wherein N is a total number of samples in the data set, and wherein classification labels indicating whether respective samples are normal or anomalous are not provided with the data set and are inferred during the training;

processing, via a model, the data set to produce an anomaly score associated with each sample in the data set;

ranking the normal and anomalous data samples according to the anomaly score associated with each data sample to produce a ranked order;

labeling based on the ranked order the N samples with latent classification labels by labeling a fraction α of the N samples that have the highest scores with an anomaly label and the remaining samples with a normal label, wherein α is a hyper parameter with a predefined proportion between 0 and 1;

retraining the model using all N samples, including the samples labeled with the anomaly label, by optimizing a joint loss function that includes a normal-data loss and an anomalous-data loss weighted based on the latent classification labels;

repeating the processing, ranking, labeling, and retraining steps to update the latent classification labels and the model parameters until the ranked order and labels for all of the N samples do not change; and outputting the trained model.

2. The method of claim 1, wherein the joint loss function is expressed by $$\mathcal{L}(\theta, y) = \sum_{i=1}^{N} (1 - y_i)\,\mathcal{L}_n^{\theta}(x_i) + y_i\,\mathcal{L}_a^{\theta}(x_i).$$

3. The method of claim 2, wherein $y_i=0$ for a normal label and $y_i=1$ for an anomaly label, wherein $y_i$ is a classification label assigned to an i-th data sample, the label indicating whether the sample is normal or anomalous.

4. The method of claim 2, wherein $y_i=0$ for a normal label and $y_i=0.5$ for an anomaly label wherein $y_i$ is a classification label assigned to an i-th data sample, the label indicating whether the sample is normal or anomalous.

5. The method of claim 2, wherein the anomaly scores is expressed by $$S_i^{train} = \mathcal{L}_n^{\theta}(x_i) - \mathcal{L}_a^{\theta}(x_i).$$

6. The method of claim 1, wherein the data set is time series data received from a sensor that is an optical sensor, an automotive sensor, or an acoustic sensor.

7. The method of claim 6 further including controlling a vehicle based on the trained model wherein the anomaly scores during operation is expressed by $$S_i^{test} = \mathcal{L}_n^{\theta}(x_i).$$

8. The method of claim 7, wherein the fraction α is based on the sensor and a parameter being sensed and the unlabeled anomalous data samples.

9. A device control system comprising:

a controller configured to, receive a data set of N samples that includes normal and unlabeled unidentified anomalous data samples, wherein N is a total number of samples in the data set, and wherein classification labels indicating whether respective samples are normal of anomalous are not provided with the data set and are inferred;

process, via a model, the data set to produce an anomaly score associated with each sample in the data set;

rank the normal and anomalous data samples according to the anomaly score associated with each data sample to produce a ranked order;

label, based on the ranked order, the N samples with latent classification labels by labeling a fraction α of the N samples that have the highest scores with an anomaly label and the remaining samples with a normal label, wherein α is a hyper parameter with a predefined proportion between 0 and 1;

retrain the model using all N samples, including the samples labeled with the anomaly label, by optimizing a joint loss function, that includes a normal-data loss and an anomalous-data loss weighted based on the latent classification labels;

repeat the process, rank, label, and retrain steps to update the latent classification labels and the model parameters until the ranked order and labels for all of the N samples do not change; and operate the device control system based on the trained model.

10. The device control system of claim 9, wherein the data set is time series data received from a sensor that is an optical sensor, an automotive sensor, or an acoustic sensor.

11. The device control system of claim 10, wherein the device is a vehicle and the system controls acceleration and deceleration of the vehicle based on the trained model wherein the anomaly scores during operation is expressed by $$S_i^{test} = \mathcal{L}_n^{\theta}(x_i).$$

12. The device control system of claim 9, wherein the joint loss function is expressed by $$\mathcal{L}(\theta, y) = \sum_{i=1}^{N} (1 - y_i)\mathcal{L}_n^{\theta}(x_i) + y_i\mathcal{L}_a^{\theta}(x_i).$$

13. The device control system of claim 12, wherein $y_i=0$ for a normal label and $y_i=1$ for an anomaly label wherein $y_i$ is a classification label assigned to an i-th data sample, the label indicating whether the sample is normal or anomalous.

14. The device control system of claim 12, wherein $y_i=0$ for a normal label and $y_i=0.5$ for an anomaly label wherein $y_i$ is a classification label assigned to an i-th data sample, the label indicating whether the sample is normal or anomalous.

15. The device control system of claim 9, wherein the anomaly scores is expressed by $$S_i^{train} = \mathcal{L}_n^{\theta}(x_i) - \mathcal{L}_a^{\theta}(x_i).$$

16. A system for performing at least one perception task associated with autonomous control of a vehicle, the system comprising:

a processor; and a memory including instructions that, when executed by the processor, cause the processor to:

receive a data set of N samples that includes normal and unlabeled unidentified anomalous data samples, wherein N is a total number of samples in the data set, and wherein classification labels indicating whether respective samples are normal of anomalous are not provided with the data set and are inferred during the training;

process, via a model, the data set to produce an anomaly score associated with each sample in the data set;

rank the normal and anomalous data samples according to the anomaly score associated with each data sample to produce a ranked order;

label, based on the ranked order, the N samples with latent classification labels by labeling a fraction α of the N samples that have the highest scores with an anomaly label and the remaining samples with a normal label, wherein α is a hyper parameter with a predefined proportion between 0 and 1;

retrain the model using all N samples, including the samples labeled with the anomaly label, by optimizing a joint loss function that includes a normal-data loss and an anomalous-data loss weighted based on the latent classification labels;

repeat the process, rank, label, and retrain steps to update the latent classification labels and the model parameters until the ranked order and labels for all of the N samples do not change; and operate the vehicle based on the trained model.

17. The system of claim 16, wherein the joint loss function is expressed by $$\mathcal{L}(\theta, y) = \sum_{i=1}^{N} (1 - y_i)\mathcal{L}_n^{\theta}(x_i) + y_i\mathcal{L}_a^{\theta}(x_i).$$

18. The system of claim 17, wherein $y_i=0$ for a normal label and $y_i=1$ for an anomaly label wherein $y_i$ is a classification label assigned to an i-th data sample, the label indicating whether the sample is normal or anomalous.

19. The system of claim 17, wherein $y_i=0$ for a normal label and $y_i=0.5$ for an anomaly label wherein $y_i$ is a classification label assigned to an i-th data sample, the label indicating whether the sample is normal or anomalous.

20. The system of claim 16, wherein the anomaly scores is expressed by $$S_i^{train} = \mathcal{L}_n^{\theta}(x_i) - \mathcal{L}_a^{\theta}(x_i).$$

* * * * *